United States Patent Office.

JAMES BARWICK AND SAMUEL TINDALL, OF SILVERTOWN, ENGLAND, ASSIGNORS TO THEMSELVES AND CHARLES T. DE FOREST, OF STAMFORD, CONNECTICUT.

Letters Patent No. 71,121, dated November 19, 1867.

IMPROVED PISTON-PACKING FOR STEAM ENGINES.

The Schedule referred to in these Letters Patent and making part of the same.

TO WHOM IT MAY CONCERN:

Be it known that we, JAMES BARWICK and SAMUEL TINDALL, both of Silvertown, in the county of Essex, England, Great Britain, have invented certain new and useful Improvements in Packing for the Piston-Rods of Steam Engines, and of pumps for raising or forcing hot fluids, acids, and other corrosive matters, which improvements are also applicable to the packing of the stuffing-boxes or glands of the spindles or axes of cocks or valves used for the passage of steam, hot fluids, or acids; and we hereby declare that the following is a full, clear, and exact description of the same.

The improvements relate to the use of hard India rubber, such as that commonly called ebonite or vulcanite, mixed with oil or grease.

In carrying out our improvement we prefer that the hard rubber used be reduced to dust or shavings, or other small particles, and the grease or oil mixed therewith we prefer to be such as generally used for lubricating purposes, and in quantity, as a rule about as much as the India rubber will absorb.

In applying the mixture thus obtained we, according to one method, first bind round the piston-rod or other spindle in the stuffing-box or gland a small quantity of gaskin or spun yarn or other suitable fibrous matter. Upon this we apply a layer of the mixture, then a layer of tow or other fibrous substance, then another layer of the mixture, and then another layer of the tow or other fibrous substance, and so on until the desired quantity of packing has been obtained. In reapplying the mixture to glands or stuffing-boxes that have been in use packed in this way, but which require fresh packing, we sometimes, in place of removing such old packing, or the whole of it, apply the mixture on such old packing.

According to another method we form tubes or cases of coarse linen or other suitable material, which we fill with the mixture, and such tubing so filled we apply to the glands or other packing in coils, rammed tight around the piston-rod or other spindle, to be there held in position by the cap of the gland or other packing. This method of applying the mixture will be found very convenient in practice. The tubes or cases may be of varying sizes, to suit the different sizes of glands to which the mixture is to be applied.

Having thus described our invention, and means which we adopt in carrying the same into effect, we would have it understood that we do not confine ourselves to the precise means for applying the same as described, so long as the peculiar character of the invention be retained; but what we do claim, is—

The application and use for the purposes hereinbefore described, of hard India rubber, or its equivalent, mixed with oil or grease, substantially as herein set forth.

JAMES BARWICK,
SAMUEL TINDALL.

Witnesses:
A. POLLOCK,
J. A. RICHARDSON.